(12) United States Patent
Kun et al.

(10) Patent No.: US 9,190,862 B2
(45) Date of Patent: Nov. 17, 2015

(54) CHARGING CURRENT CALIBRATION

(71) Applicant: QUALCOMM Incorporated, San Diego, CA (US)

(72) Inventors: Cheong Kun, San Diego, CA (US); Eric B Zeisel, San Diego, CA (US); David Keitel, San Diego, CA (US); Eric I Mikuteit, San Diego, CA (US); Abhijeet V Dharmapurikar, San Diego, CA (US); Todd R Sutton, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 13/785,677

(22) Filed: Mar. 5, 2013

(65) Prior Publication Data
US 2014/0055082 A1     Feb. 27, 2014

Related U.S. Application Data

(60) Provisional application No. 61/692,286, filed on Aug. 23, 2012.

(51) Int. Cl.
| | |
|---|---|
| *H02J 7/00* | (2006.01) |
| *H02J 7/04* | (2006.01) |
| *H02J 7/02* | (2006.01) |
| *H01M 10/44* | (2006.01) |

(52) U.S. Cl.
CPC ............. *H02J 7/007* (2013.01); *H02J 7/0068* (2013.01); *H02J 7/022* (2013.01); *H02J 7/044* (2013.01); *H01M 10/44* (2013.01)

(58) Field of Classification Search
CPC ......... H02J 7/007; H02J 7/0068; H02J 7/022; Y02E 60/12; H01M 10/44

USPC .................................. 320/107, 128, 137, 162
See application file for complete search history.

(56) References Cited

U.S. PATENT DOCUMENTS

| | | | | |
|---|---|---|---|---|
| 3,417,308 | A | | 12/1968 | Mandel et al. |
| 5,955,869 | A | * | 9/1999 | Rathmann ............ G01R 31/3648 320/132 |
| 6,025,695 | A | * | 2/2000 | Friel .................. H01M 10/4257 112/130 |
| 6,051,957 | A | * | 4/2000 | Klein .................. G01R 31/3686 320/107 |
| 6,133,712 | A | | 10/2000 | Yeon |
| 6,331,762 | B1 | * | 12/2001 | Bertness ............. G01R 31/3627 320/134 |
| 7,528,571 | B2 | * | 5/2009 | Kernahan ............... H01M 10/44 320/107 |
| 7,554,296 | B2 | * | 6/2009 | Mizuno .............. G01R 31/3624 320/106 |
| 7,573,237 | B2 | * | 8/2009 | Cutrona ............... G01R 31/362 320/114 |

(Continued)

OTHER PUBLICATIONS

International Search Report and Written Opinion—PCT/US2013/056054—ISA/EPO—May 13, 2014.

(Continued)

*Primary Examiner* — M'Baye Diao

(57) ABSTRACT

Exemplary embodiments are directed to systems, devices, methods, and computer-readable media for calibrating a charging current. A device may include a charger for conveying an output voltage to a chargeable device. The device may also include a monitoring system including an analog-to-digital converter for measuring a current received by the chargeable device. Further, the device may include a control device configured to receive a charging current value from the monitoring system and convey a signal to the charger in response to a comparison of the charging current value to a target current value.

30 Claims, 8 Drawing Sheets

(56) References Cited

U.S. PATENT DOCUMENTS

| | | | | |
|---|---|---|---|---|
| 7,590,365 B2* | 9/2009 | Miyaji | G03G 15/5037 | |
| | | | 399/176 | |
| 7,705,602 B2* | 4/2010 | Bertness | G01R 31/007 | |
| | | | 320/104 | |
| 7,759,902 B2* | 7/2010 | Gangsto | H02J 7/0016 | |
| | | | 320/132 | |
| 7,999,505 B2* | 8/2011 | Bertness | G01R 31/36 | |
| | | | 320/104 | |
| 8,143,860 B2* | 3/2012 | Gangsto | H02J 7/0016 | |
| | | | 320/132 | |
| 8,232,773 B2 | 7/2012 | Denning et al. | | |
| 9,000,750 B2* | 4/2015 | Yu | G01R 11/185 | |
| | | | 324/105 | |
| 2005/0077878 A1 | 4/2005 | Carrier et al. | | |
| 2006/0158363 A1 | 7/2006 | Gangsto et al. | | |
| 2007/0182375 A1* | 8/2007 | Lee | H02J 7/0052 | |
| | | | 320/130 | |
| 2008/0044194 A1 | 2/2008 | Miyaji et al. | | |
| 2008/0278115 A1* | 11/2008 | Huggins | B60L 3/12 | |
| | | | 320/134 | |
| 2009/0096427 A1* | 4/2009 | Yang | H02J 7/045 | |
| | | | 320/162 | |
| 2011/0234173 A1 | 9/2011 | Kao et al. | | |
| 2012/0194141 A1 | 8/2012 | Shi et al. | | |
| 2013/0082662 A1* | 4/2013 | Carre | H02J 7/0052 | |
| | | | 320/134 | |
| 2013/0278056 A1* | 10/2013 | Koizumi | H02J 7/0068 | |
| | | | 307/18 | |
| 2014/0028285 A1* | 1/2014 | Yu | G01R 11/185 | |
| | | | 324/105 | |

OTHER PUBLICATIONS

Ng K.S., et al., "Enhanced coulomb counting method for estimating state-of-charge and state-of-health of lithium-ion batteries", Applied Energy, 86 (2009), pp. 1506-1511.

Ullah, et al., "Fast Intelligent Battery Chargin: Neural-Fuzzy Approach", WESCON '95 Conference Record, Microelectronics Communications Technology Producing Quality Products Mobile and Portable Power Emerging Technologies, 1995, pp. 614-617.

* cited by examiner

CHARGING CURRENT CALIBRATION

CLAIM OF PRIORITY UNDER 35 U.S.C. §119

The present Application for Patent claims priority to U.S. Provisional Application Ser. No. 61/692,286, filed Aug. 23, 2012, entitled "CHARGING CURRENT CALIBRATION," assigned to the assignee hereof and hereby expressly incorporated by reference in its entirety.

BACKGROUND

1. Field

The present invention relates generally to current calibration. More specifically, the present invention relates to systems, devices, methods, and computer-readable media for calibrating battery charging current.

2. Background

Modern mobile communication devices, such as cell phones, PDAs, etc., typically use a rechargeable battery. During constant-current (CC) charging of a rechargeable battery (e.g., a Lithium battery), precise control of charging current is essential for both battery safety and user experience. If a charging current for a battery exceeds a threshold level, lifecycle of the battery may be reduced and the battery may be damaged. If the charging current is too low, battery charging time may be increased.

Conventionally, battery charging methods rely on analog battery charging current control. In conventional methods and devices, battery charging current is sensed via a current sensing element, such as a resistor or a field-effect transistor (FET). A current sensing signal may then be fed to an analog control loop to regulate battery current (IBAT) during CC charging. As will be appreciated by a person having ordinary skill in the art, battery current control accuracy is affected by imperfections in analog circuits, such as the amplifier offset, etc. These analog imperfections are process, voltage and temperature (PVT) dependent. Although process variation may be limited, accuracy may be reduced across battery voltage, battery current and charger temperature. Further, achieving reasonable battery current accuracy is extremely challenging with low battery current, since the sensed signal becomes comparable to noise and/or an offset of the circuit. This often results in expensive analog circuit implementation.

A need exists for systems, devices, methods, and computer-readable media for calibrating a charging current. More specifically, a need exists for systems, devices, methods, and computer-readable media for calibrating a charging current with a coulomb counting analog-to-digital converter.

DETAILED DESCRIPTION

Figure 1:
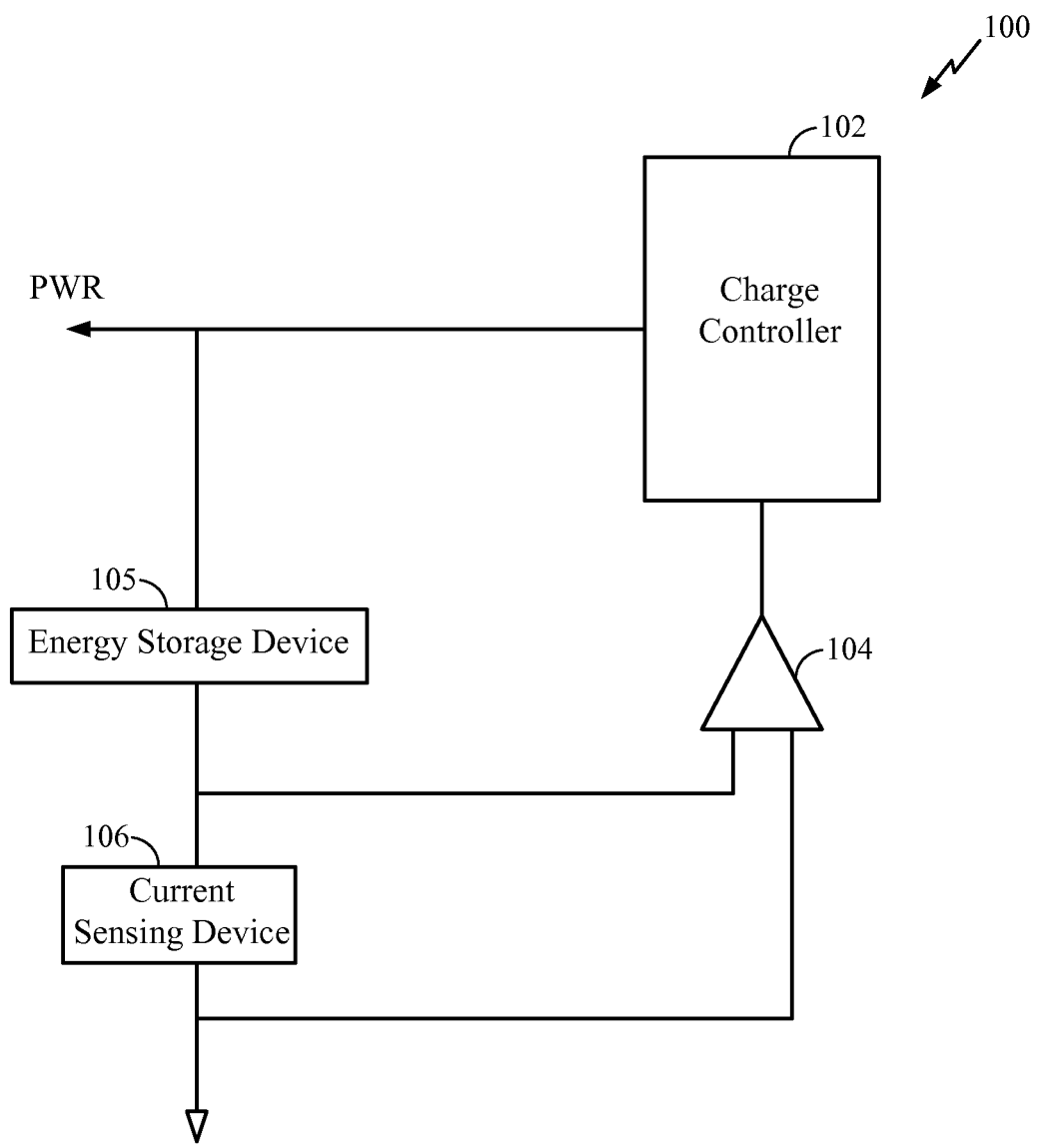
FIG. 1 illustrates a battery charging device.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Exemplary embodiments, as described herein, are directed to devices, systems, methods, and computer-readable media for calibrating a charging current. According to one exemplary embodiment, a device may include a charger for conveying an output signal to a battery. The device may further include a monitoring system including a coulomb counting analog-to-digital converter for measuring a current received by the battery. The device may further include a control device configured to receive a sampled battery current value from the monitoring system and convey a signal to the charger in response to a comparison of the sampled battery current value to a target current value.

According to another exemplary embodiment, a device may include a charger for conveying an output signal to a chargeable device and a monitoring device for measuring an amount of current received by the chargeable device. The device may further include a charger control for receiving a sampled current value from the monitoring system, comparing the sampled current value to a target window, and adjusting the output signal if the sampled current value is outside the target window.

Yet another exemplary embodiment comprises a method for calibrating a charging current. The method may comprise measuring a charging current value and comparing the charging current value to a target current value. The method may include modifying a signal conveyed to a charger in response to the comparison of the sampled battery current value to a target current value.

Another method, according to an exemplary embodiment of the present invention, comprises measuring a charging current value with a coulomb counting analog-to-digital converter and comparing the sampled charging current value to a target window. The method may also include modifying the charging current value if the sampled charging current value is not within the target window.

In accordance with yet another exemplary embodiment, a method includes receiving a sampled battery charging current value and an average battery charging current value. The method may also include comparing the average battery charging current value to a target window if the sampled battery charging current value is within a specified range of the average battery charging current value. In addition, the method may include adjusting an output signal if the average battery charging current value is not within the target window.

Yet other exemplary embodiments of the present invention comprise computer-readable media storage storing instructions that when executed by a processor cause the processor to perform instructions in accordance with one or more embodiments described herein.

Other aspects, as well as features and advantages of various aspects, of the present invention will become apparent to those of skill in the art though consideration of the ensuing description, the accompanying drawings and the appended claims.

FIG. 1 illustrates a charging device 100 including an analog control loop for regulating battery current during constant-current (CC) charging. Charging device 100 includes a charging controller 102 (e.g., buck controller) configured to convey a power signal PWR, which may be received at a load, for example. Charging device 100 further includes an energy storage device 105 (e.g., a battery) and sense amplifier 104 configured to sense a charging current through energy storage device 105 and a current sensing device 106, which may comprise a resistor or a FET. Upon receipt of a signal from sense amplifier 104, charging controller 102 may adjust a level of power signal PWR.

Figure 2:
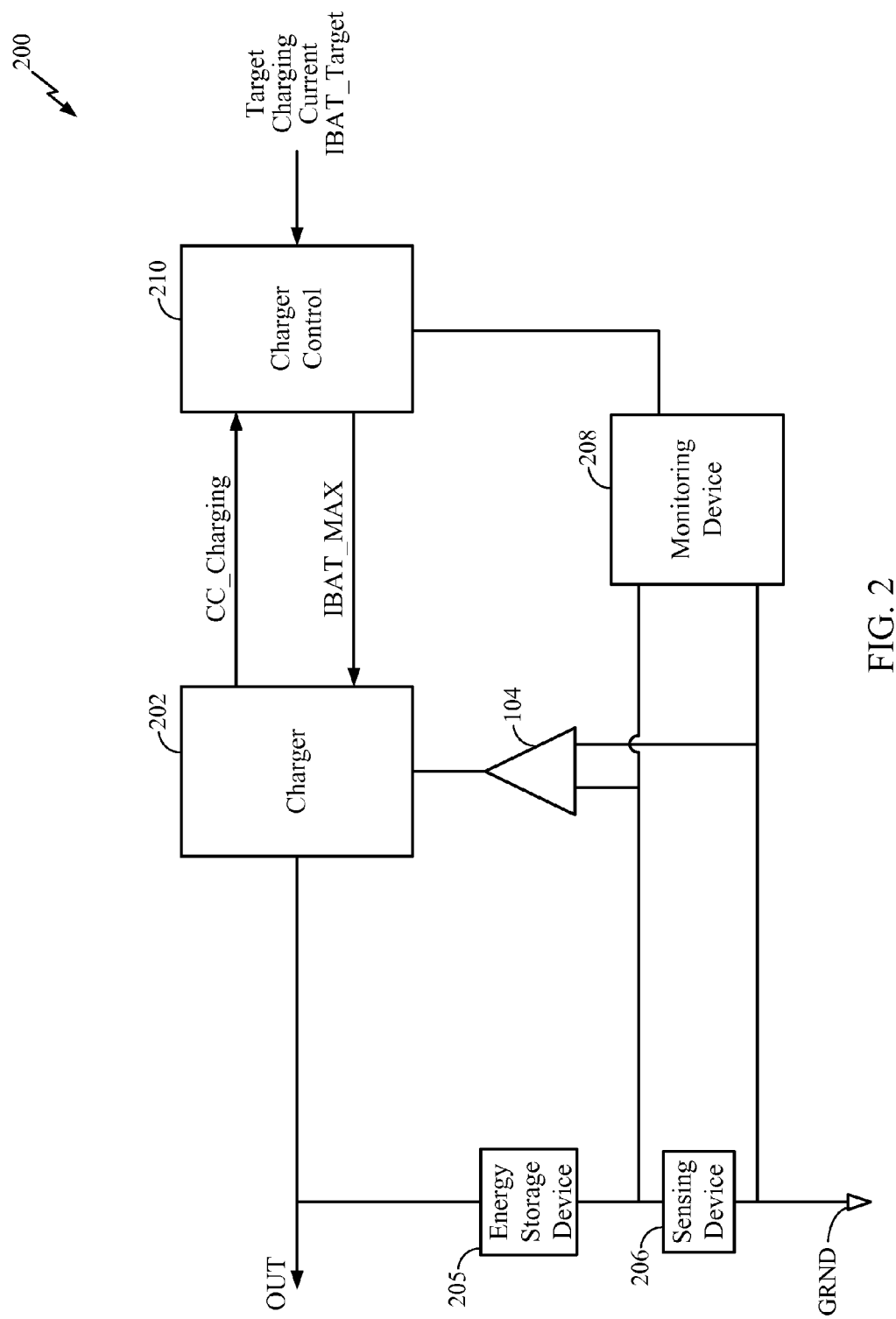
FIG. 2 is a block diagram of a device for calibrating a charging current, according to an exemplary embodiment of the present invention.

FIG. 2 is a block diagram of a device 200 for calibrating a charging current, according to an exemplary embodiment of the present invention. Device 200 includes a charger 202, which may comprise any suitable charger, such as a switch-mode charger or a linear charger. Further, charger 202 may comprise a power converter, such as a boost controller or a buck converter. Charger 202 is configured to convey an output signal OUT. As an example, output signal OUT may be conveyed to a load. Further, device 200 includes an energy storage device 205, which may comprise a battery. Device 200 further includes a sensing device 206, which may comprise, for example only, a resistor or an FET. Sensing device 206 may reside on or may be external to an integrated circuit.

Device 200 further includes a monitoring device 208 configured to measure an amount of current flowing through sensing device 206 (and through energy storage device 205) and convey a sampled charging current value to a charger control 210. It is noted that although sensing device 206 is positioned between energy storage device 205 and a ground voltage GRND, the present invention is not so limited. Rather, energy storage device 205 may be positioned between sensing device 206 and ground voltage GRND. As described more fully below, monitoring device 208 may comprise a coulomb counting analog-to-digital converter (CCADC) for measuring an amount of current flowing through sensing device 206. Further, as also described more fully below, monitoring device 208 may be configured to determine and track an average amount of charging current flowing through sensing device 206.

In addition to receiving a sampled charging current value from monitoring device 208, charger control 210 is configured to receive a target charging current, which may be identified herein as "IBAT_Target", "IBAT_TARGET" or "$I_{BAT\_TARGET}$." Target charging current IBAT_Target may comprise a target window (i.e., an upper threshold value and a lower threshold value). It is noted that target charging current IBAT_Target may be a current set by a battery manufacturer (e.g., an original equipment manufacturer (OEM)) and may comprise a recommended current target window for battery charging. Further, charger control 210 is configured to compare the sampled charging current value to the target charging current value(s). According to one exemplary embodiment, if the sampled charging current is less than a lower threshold value of a target window, charger control 210 may increase a level of a charging current setting IBAT_MAX, which is conveyed to charger 202. If the sampled battery current is higher than an upper threshold value of the target window, charger control 210 may decrease the level of charging current setting IBAT_MAX. It is noted that charger control 210 may comprise, for example only, electronic hardware, computer software, or a combination thereof.

As will be appreciated by a person having ordinary skill in the art, it is desirable for current calibration to occur during constant current (CC) charging. Accordingly, charger 202 may be configured to convey a signal CC_Charging to charger control 210 indicating whether or not device 200 is operating in a CC charging mode. More specifically, according to one exemplary embodiment, charger control 210 may be configured to query charger 202 to determine whether device 200 is operating in a CC charging mode. As a more specific example, charger control 210 may be configured to check a control loop active indicator before and after receiving a sampled charging current from monitoring device 208. Charger control 210 may proceed to calibrate charging current setting IBAT_MAX if the indicator is high on both occasions.

Figure 3:
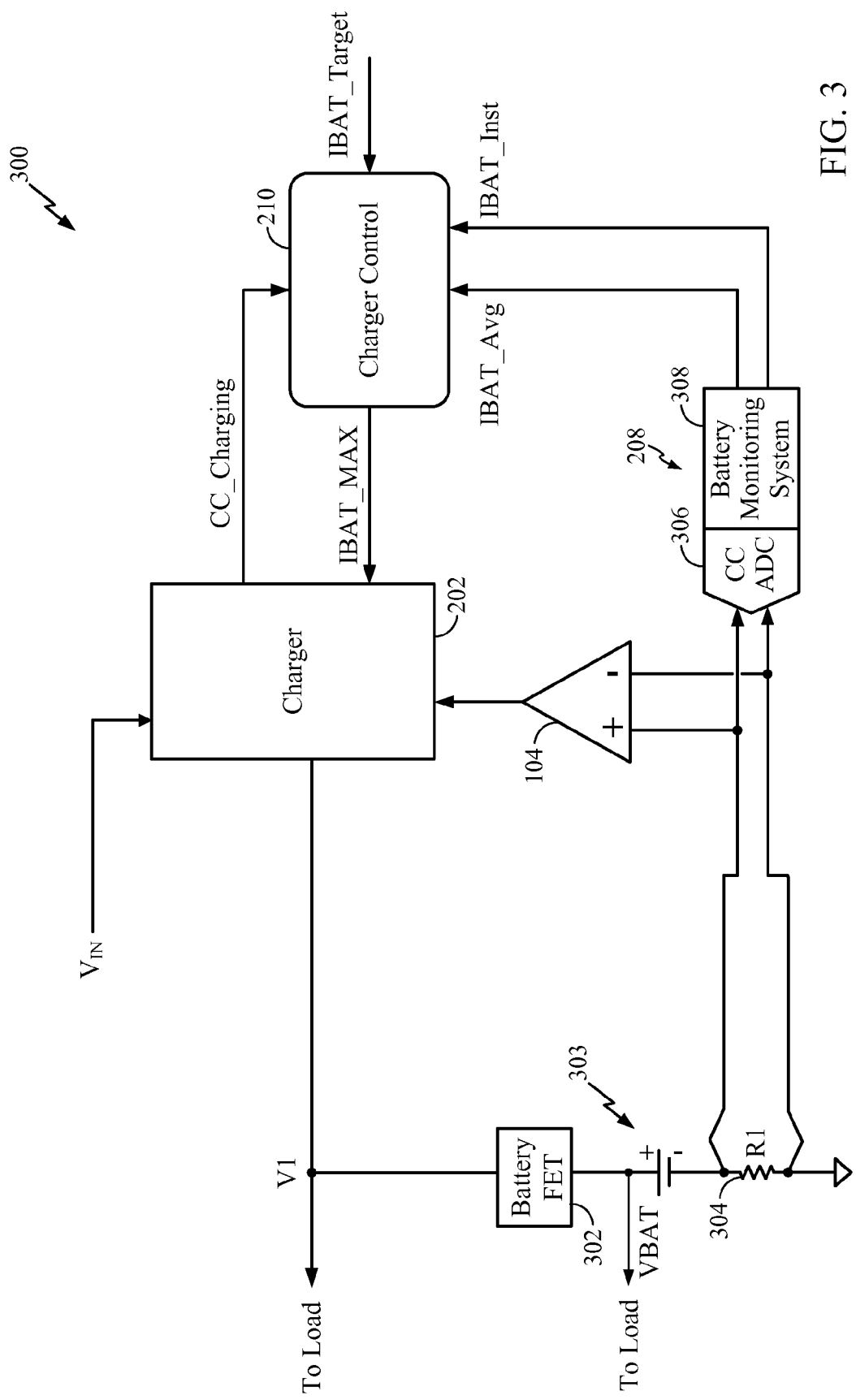
FIG. 3 is a more detailed illustration of a device for calibrating a charging current, in accordance with an exemplary embodiment of the present invention.

FIG. 3 is a more detailed illustration of a device 300, in accordance with an exemplary embodiment of the present invention. Like device 200, device 300 includes charger 202, monitoring device 208, and charger control 210. As illustrated in FIG. 3, device 300 includes various circuit components, such as a battery field-effect transistor (FET) 302, a battery 303, and a resistor R1. Charger 202 may be configured to receive an input voltage $V_{IN}$. According to one exemplary embodiment of the present invention, resistor R1 may be utilized as a sensing device for a current calibration system. Further, monitoring device 208 comprises a battery monitoring system 308, which may include a CCADC 306.

Figure 4:
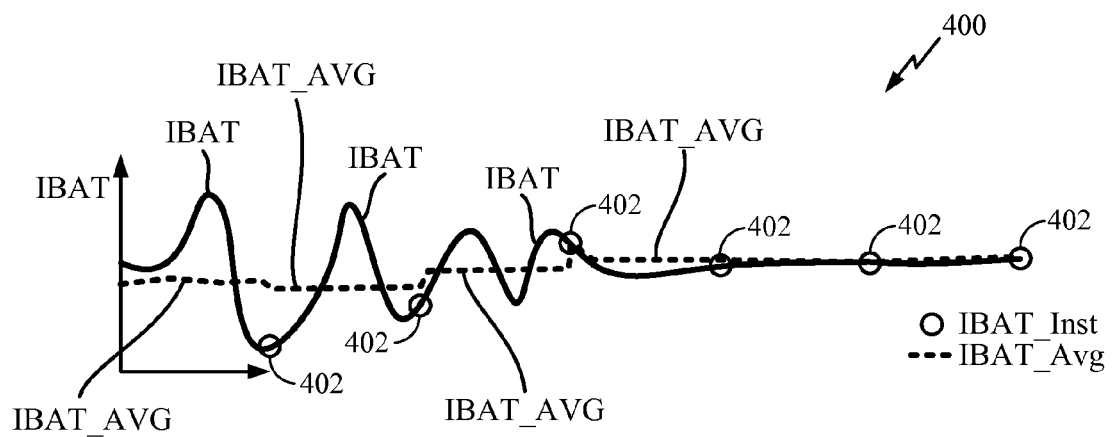
FIG. 4 is a plot illustrating waveforms of a charging current and an average value of the charging current.

FIG. 4 is a plot 400 illustrating a battery current IBAT and an average battery current over time. It is noted that the average battery current may be indentified herein as "IBAT_Avg" or $I_{BAT\_CC\_AVG}$". Plot 400 also includes a plurality of sampled (i.e., instantaneous) battery currents 402. Because, battery current IBAT of a device may be noisy, as illustrated in plot 400, it may be advantageous for charger control 210 to use an average battery current (e.g., IBAT_Avg) to calibrate a battery charging current. Further, to avoid calibrating a battery charging current while the battery current is noisy, charger control 210 may be configured to compare an average battery current (e.g., IBAT_Avg) to a sampled battery current (i.e., an instantaneous battery current, which may be indentified herein as "IBAT_Inst" or "$I_{BAT\_BMS\_INST}$"), and only make necessary adjustments to the battery current when the sampled battery current and the average battery current are within a specified range.

With reference again to FIG. 3, according to one exemplary embodiment, monitoring device 208 may be configured to convey a sampled battery current value (i.e., an instantaneous battery current value "IBAT_Inst") and an average battery current value "IBAT_Avg" to charger control 210. Further, charger control 210 may be configured to compare the sampled battery current value to the average battery current value. Charger control 210 may then modify the battery charging current, as necessary, when a difference between the sampled battery current value and the average battery current value is less than a specified threshold. As such, calibration of charging current setting IBAT_MAX may be avoided while the battery current is noisy and a sampled battery current is not within a specified range of an average battery current.

As will be understood, a CCADC (e.g., CCADC 306) is highly optimized for measuring battery current accurately within a few milliamps (mA). Further, being a sigma-delta ADC with simple analog quantizer design, a CCADC is insensitive to process, voltage and temperature (PVT) variations. Using a CCADC battery current measurement result to run-time calibrate a battery charging current can greatly improve the charging current regulation accuracy across the current range. It can also make the charging current accuracy insensitive to PVT variations. It can further allow for simpler, less accurate, and lower cost implementation of analog regulation. It is noted that a CCADC is used only as an example and any suitable device (e.g., any ADC) for measuring current may be used for implementing the present invention.

Figure 5:
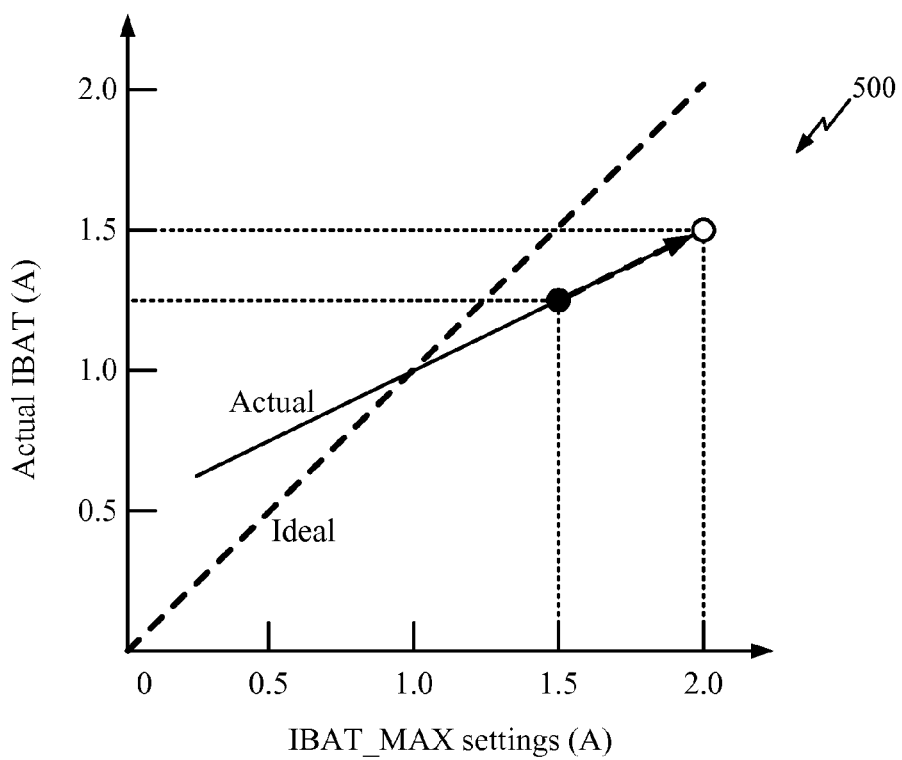
FIG. 5 is a plot illustrating a maximum charging current setting versus an actual sampled charging current.

FIG. 5 is a plot 500 illustrating test results for a battery current setting (IBAT_MAX) setting versus an actual sampled battery current (IBAT). As illustrated, the actual sampled battery current (IBAT) vs. the battery current setting (IBAT_MAX) is monotonic, and quite linear, thus allowing for a simple adjustment algorithm. As one example, if charger control 210 (see FIG. 2) sets charging current setting IBAT_MAX to 1.5 A and the actual battery current (IBAT) measured via monitoring device 208 is 1.25 A, charger control 210 may adjusts charging current setting (IBAT_MAX) until the actual battery current (IBAT) reaches the desired level. It is noted that the present invention does not require that an actual sampled battery current (e.g., IBAT) vs. a battery current setting (e.g., IBAT_MAX) to be monotonic or linear. As an example, a control algorithm of charger control 210 may be based on a look-up table.

Figure 6:
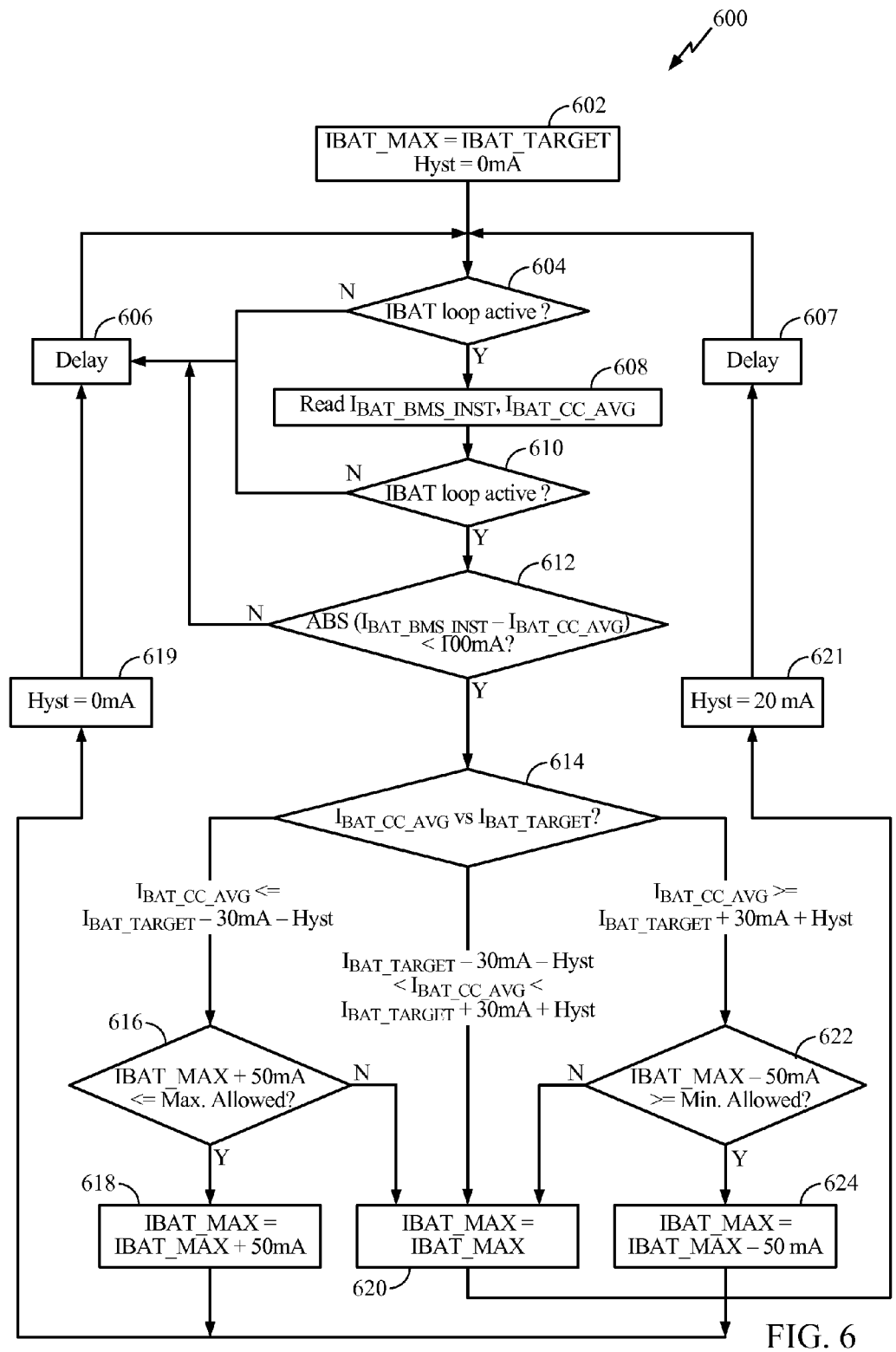
FIG. 6 is a flowchart illustrating a method, in accordance with an exemplary embodiment of the present invention.

FIG. 6 is a flowchart illustrating a method 600, according to an exemplary embodiment of the present invention. With reference to FIGS. 2 and 6, method 600 will now be described. Method 600 includes setting a charging current setting IBAT_MAX equal to a target charging current (IBAT_TARGET) and a hysteresis to zero (depicted by numeral 602). Method 600 may further include determining if a battery current loop is active (depicted by numeral 604). Stated another way, charger control 210 may query charger 202 to determine if device 200 is operating in a CC mode. If the battery current loop is not active (i.e., device 200 is not operating in a constant current mode), method 600 may include delaying for a specified time duration (e.g., 200 milliseconds) (depicted by numeral 606) and return to act 604. If the battery current loop is active, method 600 may include reading a sampled battery current value ($I_{BAT\_BMS\_INST}$) and an average battery current value ($I_{BAT\_CC\_AVG}$) (depicted by numeral 608). Stated another way, charger control 210 may receive a (instantaneous) sampled battery current value and an average battery current value from monitoring device 208.

Method 600 further includes determining if a battery current loop is still active (depicted by numeral 610). Stated another way, charger control 210 may again query charger 202 to determine if device 200 is still operating in a CC mode. If the battery current loop is not active (i.e., device 200 is not operating in a CC mode), method 600 may include delaying for a specified time duration (e.g., 200 milliseconds) (depicted by numeral 606) and return to act 604. If the battery current loop is still active, method 600 may include comparing the sampled battery current value to the average battery current value (depicted by numeral 612). If the sampled battery current value and the average battery current value are not within a specific range (e.g., 100 mA), method 600 may include delaying for a specified time duration (e.g., 200 milliseconds) (depicted by numeral 606) and return to act 604. If the sampled battery current value and the average battery current value are within a specified range (e.g., 100 mA), method 600 may include comparing the average battery current value to a target battery current value (depicted by numeral 614). Depending on the comparison of the average battery current value to the target battery current value, charger control 210 may increase the charging current (IBAT_MAX), decrease the charging current (IBAT_MAX), or leave the charging current (IBAT_MAX) unchanged.

For example, if the average battery current value ($I_{BAT\_CC\_AVG}$) is less than or equal to the target battery current value minus a target window (e.g., 30 mA) minus hysteresis (e.g., $I_{BAT\_TARGET}$−30 mA−hysteresis), method 600 may include determining if the charging current (IBAT_MAX) plus an adjustment current (e.g., 50 mA) is less than or equal to a maximum allowed current (depicted by numeral 616). If so, method 600 may include setting charging current (IBAT_MAX) equal to the charging current (IBAT_MAX) plus the adjustment current (e.g., 50 mA) (depicted by numeral 618), setting the hysteresis to zero (depicted by numeral 619), delaying for a specified time duration (depicted by numeral 606) and returning to act 604. If the charging current (IBAT_MAX) plus the adjustment current (e.g., 50 mA) is not less than or equal to a maximum allowed current, method 600 may include setting the charging current IBAT_MAX equal to the charging current IBAT_MAX (depicted by numeral 620), setting the hysteresis to a nonzero value (e.g., 20 mA) (depicted by numeral 621), delaying for a specified time duration (e.g., 10 seconds) (depicted by numeral 607) and returning to act 604.

Returning to act 614, if the average battery current value ($I_{BAT\_CC\_AVG}$) is greater than the target battery current value minus a target window (e.g., 30 mA) minus hysteresis (e.g., $I_{BAT\_TARGET}$−30 mA−hysteresis) and is less than the target battery current value plus the target window plus hysteresis (e.g., $I_{BAT\_TARGET}$+30 mA+hysteresis), method 600 may include setting the charging current (IBAT_MAX) equal to the charging current (IBAT_MAX) (depicted by numeral 620), setting the hysteresis to a nonzero value (e.g., 20 mA) (depicted by numeral 621), delaying for a specified time duration (e.g., 10 seconds) (depicted by numeral 607) and returning to act 604.

Returning again to act 614, if the average battery current value $I_{BAT\_CC\_AVG}$ is greater than or equal to the target battery current value plus a target window (e.g., 30 mA) plus hysteresis (e.g., $I_{BAT\_TARGET}$+30 mA+hysteresis), method 600 may include determining whether the charging current (IBAT_MAX) minus an adjustment current (e.g., 50 mA) is greater than or equal to a minimum allowed current (depicted by numeral 622). If so, method 600 may include setting the charging current (IBAT_MAX) equal to the charging current (IBAT_MAX) minus the adjustment current (e.g., 50 mA) (depicted by numeral 624), setting the hysteresis to zero (depicted by numeral 619), delaying for a specified time duration (depicted by numeral 606) and returning to act 604. If the charging current (IBAT_MAX) minus the adjustment current (e.g., 50 mA) is not greater than or equal to a minimum allowed current, method 600 may include setting the charging current (IBAT_MAX) equal to the charging current IBAT_MAX (depicted by numeral 620), setting the hysteresis to a nonzero value (e.g., 20 mA) (depicted by numeral 621), delaying for a specified time duration (e.g., 10 seconds) (depicted by numeral 607) and returning to act 604.

It is noted that although FIG. 6 identifies specific values for adjustment currents, target windows, and current ranges, embodiments of the present invention are not so limited. Rather, the adjustment currents, target windows, and current ranges may comprise any desired and suitable value.

Figure 7:
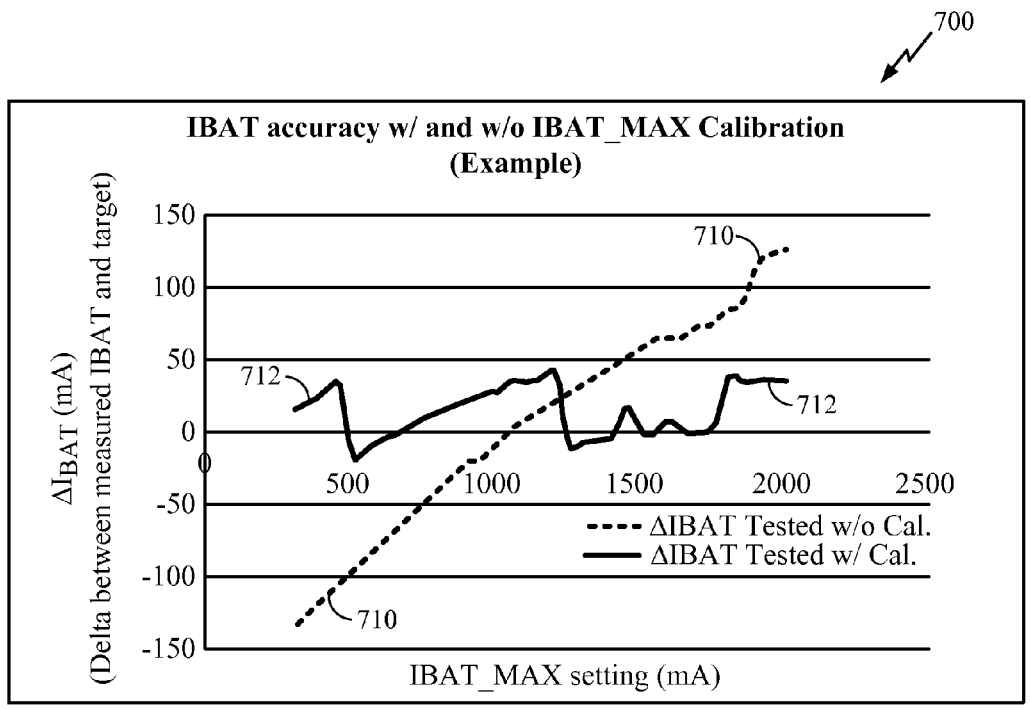
FIG. 7 is a plot illustrating various charging current waveforms.

FIG. 7 is a plot 700 depicting results of calibrating a battery current (e.g., IBAT_MAX). Waveform 710 depicts a battery current accuracy without calibration. Further, waveform 712 depicts a battery current accuracy with calibration according to one or more exemplary embodiments of the present invention. As illustrated by waveform 712, actual IBAT is well within +/−50 mA of the target value across the IBAT_MAX settings.

Figure 8:
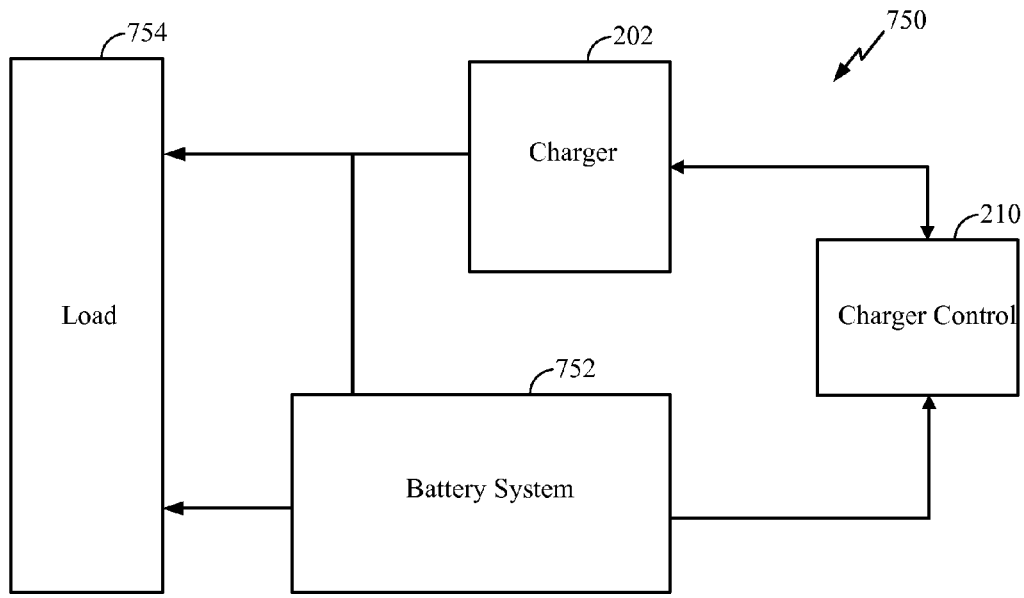
FIG. 8 is a block diagram of an electronic system, in accordance with an exemplary embodiment of the present invention.

FIG. 8 is a block diagram illustrating an electronic system 750, according to an exemplary embodiment of the present invention. Electronic system 750 includes charger 202 coupled to each of a battery system 752, charger control 210, and a load 754. Battery system 752 may include, for example only, one or more batteries, one or more sensing devices for determining a current conveyed from charger 202 to the one or more batteries, and one or more monitoring devices (e.g., monitoring device 208 of FIGS. 2 and 3). Battery system 752 may be configured for sensing an amount of current conveyed from charger 202 to the one or more batteries and, in response thereto, convey one or more signals (e.g., instantaneous battery current value "IBAT_Inst" and/or average battery current value "IBAT_Avg") to charger control 210. Upon receipt of the one or more signal conveyed from battery system 752, charger control 210 may adjust the operation of charger 201, as needed, to ensure the one or more batteries within battery system 752 receive an optimal charging current from charger 202.

Figure 9:
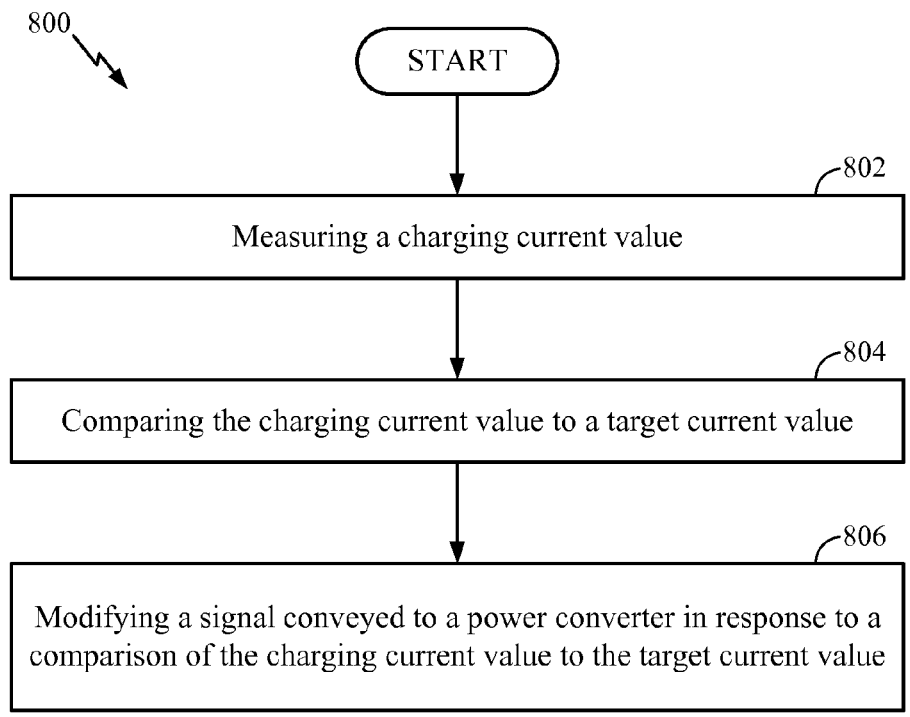
FIG. 9 is a flowchart illustrating another method, according to an exemplary embodiment of the present invention.

FIG. 9 is a flowchart illustrating another method 800, in accordance with one or more exemplary embodiments. Method 800 may include measuring a charging current value (depicted by numeral 802). Method 800 may also include comparing the charging current value to a target current value (depicted by numeral 804). Method 800 may further include modifying a signal conveyed to a power converter in response to a comparison of the charging current value to the target current value (depicted by numeral 806).

Figure 10:
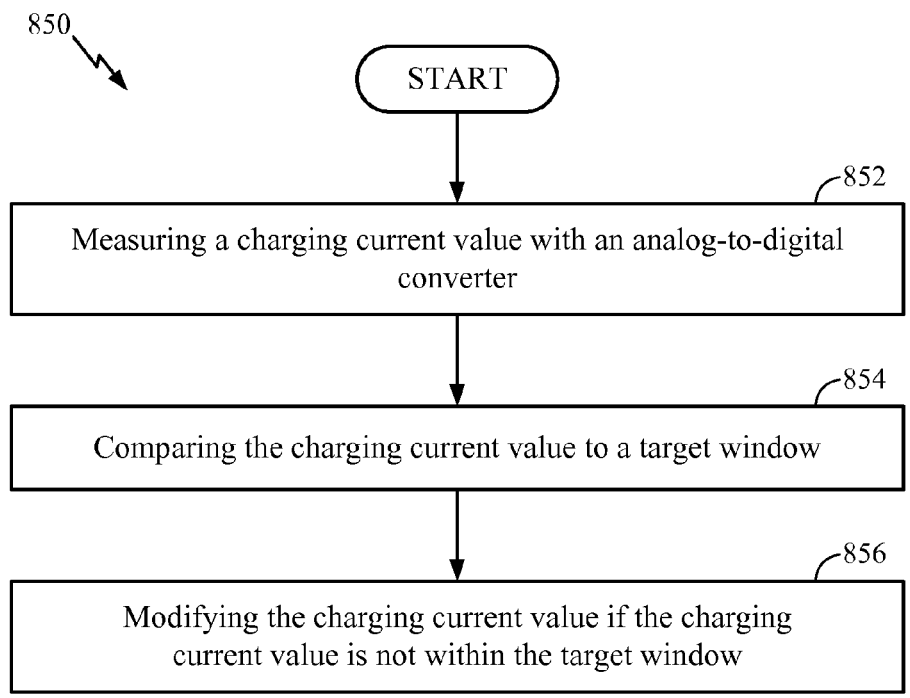
FIG. 10 is a flowchart illustrating another method, according to an exemplary embodiment of the present invention.

FIG. 10 is a flowchart illustrating another method 850, in accordance with one or more exemplary embodiments. Method 850 may include measuring a charging current value with an analog-to-digital converter (depicted by numeral 852). For example, the charging current may be measured with a coulomb-counting analog-to-digital converter. Further, method 850 may include comparing the charging current value to a target window (depicted by numeral 854). Method 850 may also include modifying the charging current value if the charging current value is not within the target window (depicted by numeral 856).

Figure 11:
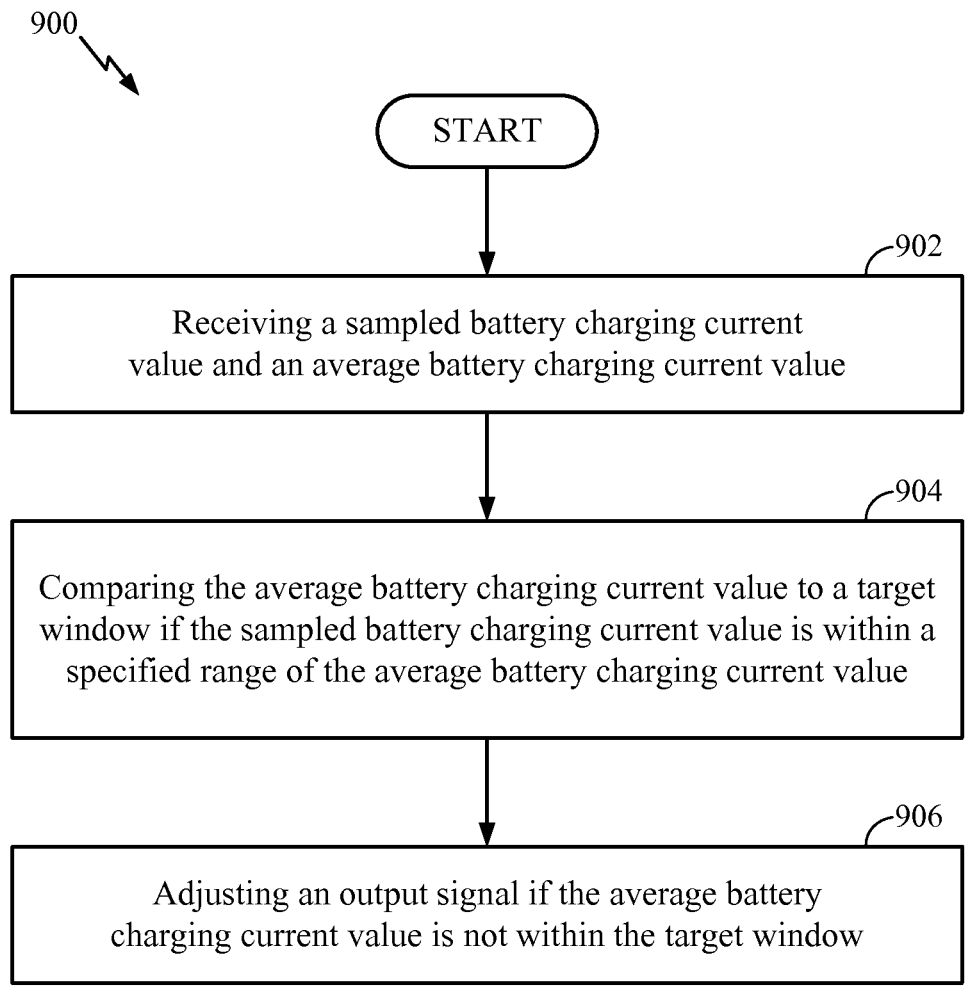
FIG. 11 is a flowchart illustrating yet another method, in accordance with an exemplary embodiment of the present invention.

FIG. 11 is a flowchart illustrating yet another method 900, in accordance with one or more exemplary embodiments. Method 900 may include receiving a sampled battery charging current value and an average battery charging current value (depicted by numeral 902). Method 900 may also include comparing the average battery charging current value to a target window if the sampled battery charging current value is within a specified range of the average battery charging current value (depicted by numeral 904). Method 900 may further include adjusting an output signal if the average battery charging current value is not within the target window (depicted by numeral 906).

Exemplary embodiments, as described herein, provide significant performance advantages compared to conventional devices and methods. As one example, compared to conventional methods and devices that may provide +/−5% accuracy, the exemplary embodiments may provide +/−50 mA battery current control accuracy across a charging current range.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
    a charger for conveying an output signal to a battery;
    a monitoring system including coulomb-counting analog-to-digital converter for measuring a current received by the battery; and
    a control device configured to receive a sampled battery current value from the monitoring system and calibrate a signal conveyed to the charger in response to a comparison of the sampled battery current value to a target current value during constant-current charging.

2. The device of claim 1, the control device comprising at least one of electronic hardware and computer software.

3. The device of claim 1, the control device further configured to receive an average current value received by the battery from the monitoring system.

4. The device of claim 3, the control device configured to compare the sampled battery current value to the average current value.

5. The device of claim 4, the control device configured to calibrate the signal to the charger if a difference between the sampled battery current value and the average current value is less than a threshold.

6. The device of claim 1, the control device configured to compare the sampled battery current value to the target current value.

7. The device of claim 1, the control device configured to receive a signal from the charger indicating that the charger is in a constant current charging mode.

8. The device of claim 1, the control device configured to:
    increase a current of the signal conveyed to the charger if the sampled battery current value is less than the target current value; and
    decrease the current of the signal conveyed to the charger if the sampled battery current value is greater than the target current value.

9. A device, comprising:
    a charger for conveying an output signal to a chargeable device;
    a monitoring device for measuring a current received by the chargeable device; and
    a charger control for receiving a sampled current value from the monitoring system, comparing the sampled current value to a target window of a target current value during constant-current charging and adjusting the charger if the sampled current value is outside the target window.

10. The device of claim 9, the monitoring device comprising a coulomb-counting analog-to-digital converter.

11. The device of claim 9, the monitoring device configured to convey an average current value received by the chargeable device and the sampled current value received by the chargeable device to the charger control.

12. The device of claim 11, the charger control configured to compare the average current value to the target window if the sampled current value is within a specified range of the average current value.

13. The device of claim 9, the charger comprising one of a switch-mode charger and a linear charger.

14. The device of claim 9, the charger control for comparing the average current value to the target window and adjusting the charger if the average current value is outside the target window and the charger is operating in a constant current charger mode.

15. The device of claim 9, the charger control for increasing an input voltage of the charger if the average current value is less than the target window and decreasing the input voltage of the charger if the average current value is greater than the target window.

16. The device of claim 9, the charger comprising a buck converter.

17. A method, comprising:
    sampling a charging current value;
    comparing the charging current value to a target current value; and
    modifying a signal conveyed to a power converter in response to a comparison of the charging current value to the target current value during constant-current charging.

18. The method of claim 17, further comprising measuring an average charging current value.

19. The method of claim 18, further comprising comparing the charging current value to the average charging current value.

20. The method of claim 19, the comparing the charging current value to the target current value comprising comparing the charging current value to the target current value if the difference between the average charging current value and the charging current value is less than a threshold.

21. The method of claim 17, the measuring the charging current value comprising measuring the charging current value with a coulomb-counting analog-to-digital converter.

22. The method of claim 17, the measuring a charging current value comprising measuring a charging current value if the power converter is in a constant charging mode.

23. A method, comprising:
    measuring a charging current value with an analog-to-digital converter;
    comparing the charging current value to a target window of a target current value during constant-current charging; and
    modifying the charging current value if the charging current value is not within the target window.

24. The method of claim 23, the comparing the charging current value to a target window comprises comparing the charging current value to a target window specified by a battery manufacturer.

25. A method, comprising:
    receiving a sampled battery charging current value and an average battery charging current value;
    comparing the average battery charging current value to a target window of a target current value during constant-current charging if the sampled battery charging current value is within a specified range of the average battery charging current value; and
    adjusting an output signal if the average battery charging current value is not within the target window.

26. A non-transitory computer-readable storage medium storing instructions that when executed by a processor cause the processor to perform instructions for calibrating a battery charging current, the instructions comprising:
    receiving a sampled battery charging current value and an average battery charging current value;
    comparing the average battery charging current value to a target window of a target current value during constant-current charging if the sampled battery charging current value is within a specified range of the average battery charging current value; and
    adjusting an output signal if the average battery charging current value is not within the target window.

27. The non-transitory computer-readable storage medium of claim 26, the instructions further comprising determining if a charger is in a constant charging mode.

28. A device, comprising:
    means for measuring a charging current value;
    means for comparing the charging current value to a target current value during constant-current charging; and
    means for modifying a signal conveyed to a power converter in response to a comparison of the charging current value to the target current value.

29. A device, comprising:
    means for measuring a charging current value with a coulomb-counting analog-to-digital converter;
    means for comparing the charging current value to a target window of a target current value during constant-current charging; and
    means for modifying the charging current value if the charging current value is not within the target window.

30. A device, comprising:
    means for receiving a sampled battery charging current value and an average battery charging current value;
    means for comparing the average battery charging current value to a target window of a target current value during constant-current charging if the sampled battery charging current value is within a specified range of the average battery charging current value; and
    means for modifying an output signal if the average battery charging current value is not within the target window.

\* \* \* \* \*